Feb. 4, 1969    R. E. TABER    3,426,115
METHOD OF MAKING A SELF-COILING SHEET
Original Filed July 17, 1958

INVENTOR.
RUSSELL E. TABER,
BY

ATTORNEYS.

3,426,115
METHOD OF MAKING A SELF-COILING SHEET
Russell E. Taber, Atlanta, Ga., assignor to The Mead Corporation, Atlanta, Ga., a corporation of Ohio
Continuation of application Ser. No. 164,372, Jan. 4, 1962, which is a division of application Ser. No. 749,151, July 17, 1958. This application July 23, 1965, Ser. No. 477,637
U.S. Cl. 264—160          2 Claims
Int. Cl. B29c *25/00*

---

ABSTRACT OF THE DISCLOSURE

Self-coiling sheets of crystalline resin material, e.g., polyethylene terephthalate (Mylar), are produced by cutting an uncoiled sheet having a thickness of about .0075 inch to the required dimension, thereafter rolling the sheet into a multi-layered convolute coiled sheet. The coiled sheet is heated to a temperature below the melting point of the terephthalate resin (250° to 255° C.) to relieve the internal stresses due to coiling without causing softening or deformation of the coiled sheet. After the heating, the sheet is allowed to cool while maintained in the coiled condition in order to provide a substantially permanent coil set.

---

This application is a continuation of application Ser. No. 164,372 (now abandoned) filed Jan. 4, 1962, which in turn is a division of application Ser. No. 749,151 filed July 17, 1958 (now abondoned), which is in turn a continuation-in-part of the application filed Sept. 5, 1956, and now U.S. Letters Patent No. 2,852,143, dated Sept. 16, 1958.

This invention relates to a self-coiling sheet such as may be useful in connection with display devices as disclosed in my U.S. patent mentioned above.

It is the principal object of the present invention to provide a method of producing a self-coiling sheet member which has utility in various structures and devices, among which reference may be had to the display device disclosed in my above mentioned patent.

The objects of my invention and other objects which may be described in greater detail hereinafter, or which will be apparent to one skilled in the art upon reading these specifications, I accomplish by that certain method of which I shall now describe an exemplary embodiment.

Briefly in the practice of my invention, I provide a method for imparting to a sheet of plastic material a permanent coil set. The material may be any suitable material which may be given a permanent coil set according to the teachings of the present invention. I have used with success a polyester film manufactured by the Du Pont Company under the trademark "Mylar." "Mylar" is a highly durable crystalline, transparent, substantially non-elastic, film made from polyethylene terephthalate. This is a clear plastic sheet having a melting point between 250° and 255° C., and for most purposes a suitable thickness will be .0075 inch. This material may be bought in sheets cut to a desired size, rolled up and then heated up to a point near but below the melting point of the particular material used while held in coiled condition. "Near but below the melting point" is used in this specification simply to indicate that the plastic material should be heated to a temperature at which internal stresses due to coiling are relieved, but below that at which plastic flow and deformation take place. When the material heated to the temperature described above cools off it has taken a permanent coil set so that it may be unrolled but will roll up as soon as it is released.

Figure 3:
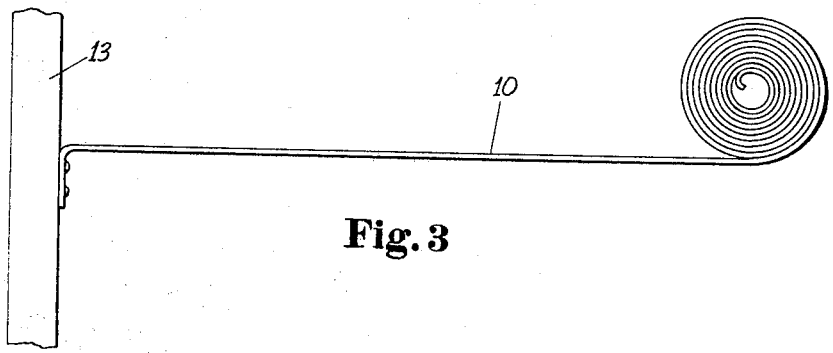
FIGURE 3 shows the finished product secured in the position utilized in connection with display devices according to U.S. Patent No. 2,852,143.
Figure 2:
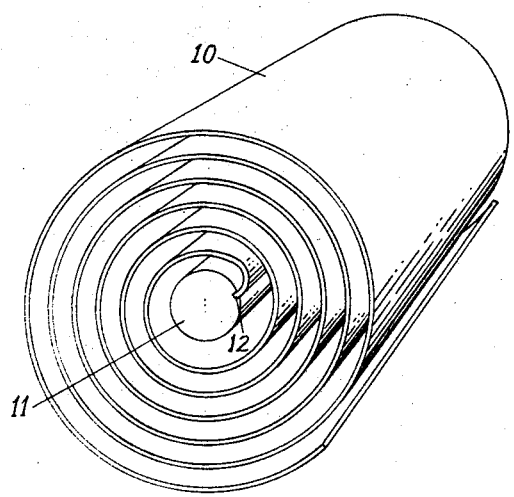
FIGURE 2 shows the sheet of FIGURE 1 coiled about a mandrel.
Figure 1:
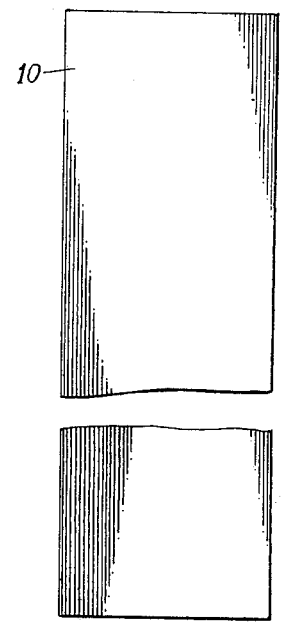
FIGURE 1 shows a flat sheet of plastic material in the flat state, the starting material for the practice of the instant invention.

In FIGURE 1, the reference numeral 10 indicates a sheet of polyester film cut to the size required of the sheet in its uncoiled condition. In FIGURE 2, the sheet 10 is shown wound about a mandrel 11 having a slot 12. The sheet as thus coiled is then heated by any suitable means to a temperature near but below its melting point, and then cooled back to room temperature. At this time, the free end of the sheet 10 may be fastened to a wall 13 or the like, as explained in U.S. Patent No. 2,852,143 incorporated by reference in the instant specification. The material so treated acquires a permanent coil set—that is, it may be unrolled, but will immediately roll up as soon as it is released, and may be coiled and uncoiled almost indefinitely.

It will be understood that various modifications may be made without departing from the spirit of my invention, and I therefore do not intend to limit myself except as set forth in the claims which follow.

The embodiments of the invention in which an exclusive property or privilege is claimed are defined as follows:

1. The method of making a self-coiling sheet of film dimensions which comprises the steps of cutting a flexible sheet of plastic material consisting essentially of crystalline polyethylene terephthalate and capable of being given a permanent coil set to the size required of said sheet in unrolled condition, rolling said sheet into a multi-layered coil of substantially concentric convolutions with the opposite surfaces thereof in opposed overlying facing relation over a substantial surface area of said sheet, maintaining said sheet in a coiled condition and while heating to a controlled temperature below the melting point of said plastic material, said melting point of said plastic material being between 250° C. and 255° C. said heaing being sufficiently high to alter the normal internal stress conditions of the coiled sheet such that the sheet acquires a permanent coil set, said controlled temperature being below that at which the opposed surfaces of the coiled sheet are plastically deformed and adhere to each other, and thereafter cooling said sheet while maintaining it in a coiled condition to provide a sheet having a permanent coil set and which may be unrolled for exposure of its surface and which when left free will automatically recoil into its multi-layered generally cylindrical coil form.

2. The method as set forth in claim 1 wherein said sheet has a thickness of about .0075 inch.

References Cited

UNITED STATES PATENTS

| | | | |
|---|---|---|---|
| 1,988,604 | 1/1935 | Merrill et al. | 174—5 |
| 2,212,128 | 8/1940 | Richter | 46—44 XR |
| 2,270,185 | 1/1942 | Dulmage | 264—292 XR |
| 2,323,286 | 6/1943 | Ward | 18—34 |
| 2,393,058 | 1/1946 | Pierce et al. | |
| 2,586,763 | 2/1952 | Judisch. | |
| 2,796,631 | 6/1957 | Stegmann. | |
| 2,852,143 | 9/1958 | Taber | 211—49 |

OTHER REFERENCES

Mechanical Properties of Polymers, Lawrence E. Nielsen, Reinhold Publishing Corp., New York, 1962, pp. 30–31.

ASTM Standards on Plastics, ASTM Committee D–20 on Plastics, American Society for Testing Materials, Philadephia, 11th ed., 1959, pp. 456–8.

ROBERT F. WHITE, *Primary Examiner.*

RICHARD R. KUCIA, *Assistant Examiner.*

U.S. Cl. X.R.

264—320, 339